United States Patent
Johansson et al.

(10) Patent No.: US 9,337,947 B2
(45) Date of Patent: May 10, 2016

(54) FILTER APPARATUS, MULTIPLEX DEVICE AND ASSOCIATED METHOD

(71) Applicant: Telefonaktiebolaget L M Ericsson (publ), Stockholm (SE)

(72) Inventors: Rune Johansson, Upplands Väsby (SE); Louise Ehn, Älvsjö (SE); Bo Franzon, Bro (SE); Roy Naddaf, Sollentuna (SE); Marie O'Loughlin, Stockholm (SE); Ulf Skärby, Lidingö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 171 days.

(21) Appl. No.: 14/003,064

(22) PCT Filed: Jun. 4, 2013

(86) PCT No.: PCT/SE2013/050645
§ 371 (c)(1),
(2) Date: Sep. 4, 2013

(87) PCT Pub. No.: WO2014/058374
PCT Pub. Date: Apr. 17, 2014

(65) Prior Publication Data
US 2014/0105203 A1    Apr. 17, 2014

Related U.S. Application Data

(60) Provisional application No. 61/737,346, filed on Dec. 14, 2012, provisional application No. 61/712,456, filed on Oct. 11, 2012.

(51) Int. Cl.
*H04B 1/10* (2006.01)
*H04J 1/04* (2006.01)
*H04B 7/155* (2006.01)

(52) U.S. Cl.
CPC .............. *H04J 1/045* (2013.01); *H04B 7/15542* (2013.01)

(58) Field of Classification Search
CPC ...... H04L 5/14; H04L 27/2334; H04L 27/264
USPC ........................................ 375/350; 370/343
See application file for complete search history.

(56) References Cited

U.S. PATENT DOCUMENTS

| | | | | |
|---|---|---|---|---|
| 5,881,375 | A * | 3/1999 | Bonds | 455/118 |
| 5,987,304 | A * | 11/1999 | Latt | 455/17 |
| 2006/0142999 | A1 * | 6/2006 | Takada et al. | 704/205 |
| 2009/0180466 | A1 | 7/2009 | Soul et al. | |
| 2010/0120386 | A1 * | 5/2010 | Konstantinos et al. | 455/180.1 |
| 2011/0136443 | A1 | 6/2011 | Milenkovic et al. | |

* cited by examiner

*Primary Examiner* — Qutbuddin Ghulamali
(74) *Attorney, Agent, or Firm* — Coats & Bennett, PLLC

(57) ABSTRACT

It is presented a filter apparatus comprising: a first frequency shifter arranged to accept an input signal of the apparatus; a first filter; a second frequency shifter; a second filter; and a third frequency shifter, the output of which is connected to the output of the apparatus. The first frequency shifter, the first filter, the second frequency shifter, the second filter and the third frequency shifter are serially connected; and each one of the first frequency shifter, second frequency shifter and third frequency shifter has separate shift input signals, respectively. A corresponding radio base station assembly and method are also presented.

16 Claims, 6 Drawing Sheets

FILTER APPARATUS, MULTIPLEX DEVICE AND ASSOCIATED METHOD

TECHNICAL FIELD

The invention relates to a filter apparatus, a multiplex device and associated method.

BACKGROUND

In the analogue domain of cellular networks, filtering of various types is often required. For example, in the uplink part of some radio base stations, certain frequency sub bands are filtered out and shifted to new centre frequencies. This allows frequency domain multiplexing to reduce the number of cables required between antennas and the main part of the radio base station.

The frequency band varies in extent and position depending on radio technology used and/or allocations of frequencies for a particular operator. It would be beneficial if there were a filter apparatus which is configurable both in bandwidth of the desired signal and centre frequency for the output signal.

U.S. Pat. No. 5,987,304 presents a mobile telephone repeater with a variable bandwidth. The repeater comprises an uplink and downlink, each being provided with amplifier chains. Each chain comprises at least two band pass filter units coupled in series and having controllable pass bands, which at least partially overlap each other. The center frequency of the filter units are controllable so as to make the bandwidth of the resulting pass band variable. Consequently, the effective bandwidth of the amplifier chain is controllable. However, it would be beneficial if greater flexibility in configuration is achieved, preferably also with fewer components.

SUMMARY

It is an object to provide a filter apparatus with configurable characteristics in turn of pass band and output frequency of the pass band.

According to a first aspect, it is presented a filter apparatus comprising: a first frequency shifter arranged to accept an input signal of the apparatus; a first filter; a second frequency shifter; a second filter; and a third frequency shifter, the output of which is connected to the output of the apparatus. The first frequency shifter, the first filter, the second frequency shifter, the second filter and the third frequency shifter are serially connected; and each one of the first frequency shifter, second frequency shifter and third frequency shifter has separate shift input signals, respectively.

Through the provided filter apparatus, a desired frequency band can be provided by filtering out unwanted lower and higher frequency components, and the resulting signal can be provided at an arbitrary frequency. This is achieved with low component count and a cost effective structure. Moreover, the frequency band of the desired signal and its bandwidth can be configured by only adjusting the shift input signals to the first and second frequency shifters. This allows the filters to be fixed in frequency characteristics and the fillers do not need to be reconfigured in any way for various pass bands or output centre frequencies. Moreover, no switches are required to connect and/or disconnect fillers depending on configuration.

The output of the first frequency shifter may be connected to the input of the first filter, the output of the first filter may be connected to the input of the second frequency shifter, the output of the second frequency shifter may be connected to the input of the second filter, and the output of the second filter may be connected to the third frequency shifter.

The filter apparatus may further comprise a fourth frequency shifter and a third filter, connected serially between the first filter and the second frequency shifter.

The first filter may be arranged to block frequencies below a lower cut-off frequency and the second filter may be arranged to block frequencies above an upper cut-off frequency.

The first filter may be a high-pass filter and the second filter may be a low-pass filter.

The second filter may be arranged to block frequencies below a lower cut-off frequency and the first filter may be arranged to block frequencies above an upper cut-off frequency.

The first filter may be a low-pass filter and the second filter may be a high-pass filter.

The first filter may be a band-pass filter and the second filter may be a band-pass filter.

According to a second aspect, it is presented a multiplex device comprising: at least two filter apparatuses according to any one of the preceding claims arranged provide respective filtered signals at non-overlapping frequency bands on their outputs, and a combiner device comprising at least two combiner inputs, respectively connected to the outputs of the at least two filter apparatuses, the combiner device further comprising a combiner output for providing an output signal which is a combination of the signals provided on the at least two combiner inputs.

The multiplex device may comprise two combiner devices for handling two different signals of two different polarisations.

According to a third aspect, it is presented a method for filtering a signal to an output signal. The method is performed in a filter apparatus and comprises the steps of: first frequency shifting the signal using a first frequency shifter and a first shift input signal; first filtering the signal using a first filter; second frequency shifting the signal using a second frequency shifter and a second shift input signal; second filtering the signal using a second filter; and third frequency shifting the signal using a third frequency shifter and a third shift input signal, the output of which is connected to the output of the apparatus.

The first filtering step may comprise blocking frequencies below a lower cut-off frequency and the second filtering step may comprise blocking frequencies above an upper cut-off frequency.

The first filter may be a high-pass filter and the second filter may be a low-pass filter.

The second filtering step may comprise blocking frequencies below a lower cut-off frequency and the first filtering step may comprise blocking frequencies above an upper cut-off frequency.

The first filter may be a low-pass filter and the second filter may be a high-pass filter.

The first filter may be a band-pass filter and the second filter may be a band-pass filter.

The step of second frequency shifting may comprise shifting to a significantly higher frequency and shifting to frequency which is lower than the significantly higher frequency.

According to a fourth aspect, it is presented a method for multiplexing signals. The method is performed in a multiplex device comprising a first filter apparatus, a second filter apparatus and a combiner device. The method comprises the steps of: performing the method according to the third aspect in the first filter apparatus and the second filter apparatus, respectively, which provides filtered signals at non-overlapping frequency bands; and combining the filtered signals to a combined output.

It is to be noted that any feature of the first, second and third aspects may, where appropriate, be applied to any other of these aspects.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
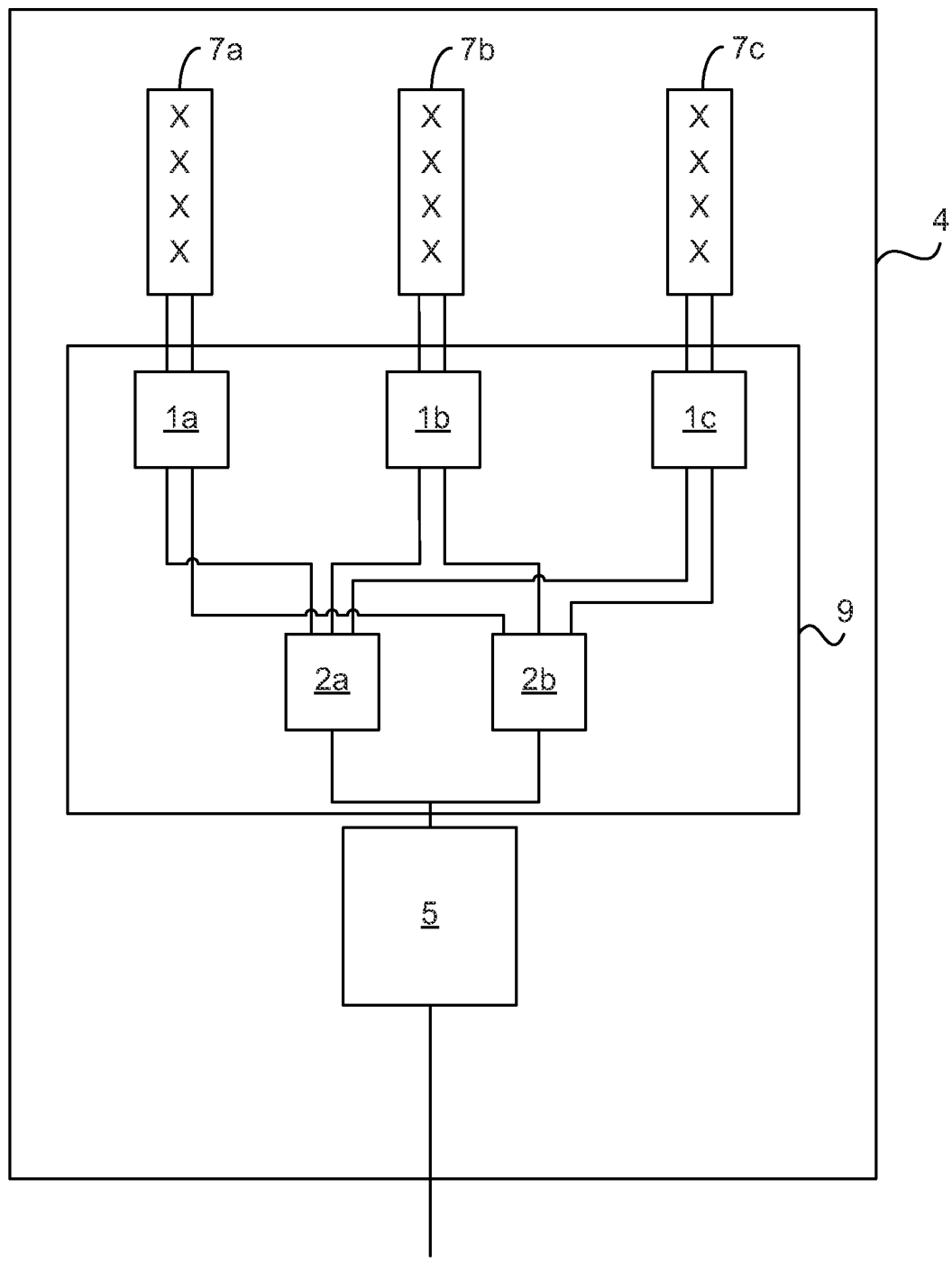
FIG. 1 is a schematic diagram illustrating an environment for receiving uplink signals, where embodiments presented herein can be applied.

FIG. 1 is a schematic diagram illustrating an environment for receiving uplink signals in a cellular network, where embodiments presented herein can be applied. Three antennas 7a-c receive radio signals in the uplink from wireless terminals and provide the received signals to respective filter apparatuses 1a-c. Each antenna 7a-c comprises one or more antenna elements, where each antenna element can optionally comprise two sections for receiving two polarisations of signals. Each antenna 7a-c can optionally be a MIMO (Multiple Input Multiple Output) antenna, in this case requiring a plurality of antenna elements in each antenna. All three antennas 7a-c are associated with a single radio base station 5. For example, the three antennas 7a-c can cover a respective sector for the radio base station 5. In the example shown in FIG. 1, three antennas 7a-c are shown. However, any other number of antennas can be provided, e.g. one, two, four, etc.

As is explained in more detail below, each one of the filter apparatuses 1a-c fillers a part of the input signal and shifts the filtered signal to a new frequency band. In this way, combiner devices 2a-b can combine the filtered signal into a single multiplexed signal. In the example illustrated in FIG. 1, two combiner devices 2a-b are shown, e.g. for each polarisation direction of the antenna elements of the antennas 7a-c. However, any number of combiner devices can be provided, e.g. one, two, three, etc. In any case, by combining the components from the filter apparatuses 1a-c, the output of each combiner device can be provided to the radio base station 5 using a single connection over a single cable, using e.g. a single optical fibre or a single galvanic connection. The radio base station 5 subsequently demultiplexes the signal components originating from the three antennas 7a-c and performs further uplink processing.

A controller configures the filter apparatuses 1a-c to provide output signals which do not overlap and can thus be combined and multiplexed on a single cable. The controller provides corresponding information to the radio base station 5 such that the radio base station 5 is able to demultiplex and separate the individual signals on the single cable. The controller can be provided at the site of the radio base station 5 and filter apparatuses 1a-c or it can be provided remotely, as long as there is a signalling connection available between the controller and the filter apparatuses 1a-c and the radio base station 5. The controller can e.g. for part of a general purpose computer with a user interface allowing an operator to configure how the multiplexing is to occur.

The radio base station 5 is of any suitable type and can also be called an evolved Node Bs, also known as eNode Bs or eNBs. The radio base station 5 could also be in the form of Node Bs, BTSs (Base Transceiver Stations) and/or BSSs (Base Station Subsystems), etc. or any other suitable base station for any current or future mobile communication standard.

The components shown in FIG. 1 are part of a cellular network and may e.g. comply with any one or a combination of LTE-SAE (Long Term Evolution—System Architecture Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), WiMAX (Worldwide Interoperability for Microwave Access) or any other current or future wireless network, such as LTE-Advanced, as long as the principles described hereinafter are applicable.

The filter apparatuses 1a-c along with the combiners 2a-b are collectively denoted a multiplex device 9.

The antennas 7a-c, the filter apparatuses 1a-c, the combiners 2a-b and the radio base station 5 are, in combination, here denoted a radio base station assembly 4. By multiplexing the signals over the single connection, a lot of energy is saved in the radio base station assembly 4. It has been shown that up to 40% of the energy usage can be saved in this way.

Figure 2A:
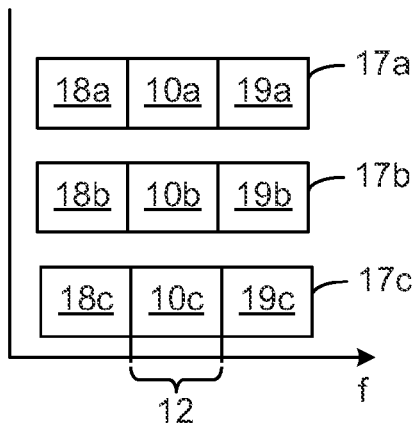
FIGS. 2A-C are schematic graphs illustrating how signals can be multiplexed using frequency shifts using the frequency apparatuses of FIG. 1.
Figure 2B:
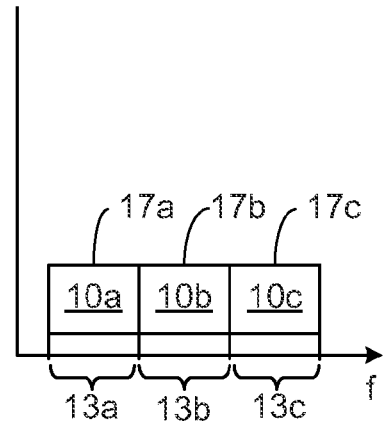
Figure 2C:
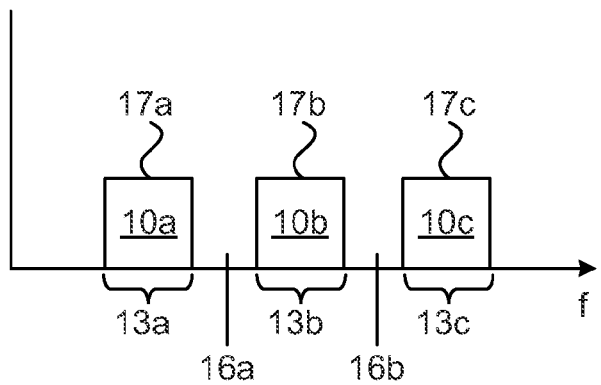

FIG. 2A-C are schematic graphs illustrating how three signals 17a-c can be multiplexed using frequency shifts using the frequency apparatuses 1a-c of FIG. 1. In FIG. 2A, three signals 17a-c are shown as received, e.g. by the respective antennas 7a-c of FIG. 1. In other words, the first signal 17a is received by the first antenna 7a, the second antenna is received by the second antenna 7b and the third signal is received by the third antenna. The desired signal of all three signals 17a-c is in a particular signal frequency band 12. The three signals 17a-c thus comprise a respective desired signal 10a-c, in the frequency band of interest. It can be seen from FIG. 2A that three desired signals 10a-c can not directly be frequency division multiplexed since the three desired signals 10a-c all occupy the same signal frequency band 12. Furthermore, for each desired signal 10a-c, there are a respective unwanted lower frequency component 18a-c and a respective unwanted higher frequency component 19a-c.

This is where the filter apparatuses 1a-c of FIG. 1 comes in. Using the respective filter apparatuses 1a-c for the respective signals, the unwanted lower and upper frequency components 18a-c, 19a-c are filtered out. Moreover, as seen in FIG. 2B, the filter apparatuses 1a-c shift the frequency of the desired signals 10a-c so that these could be frequency division multiplexed on a single cable. For example, the first desired signal 10a is then a filtered signal which has been shifted to a first frequency band 13a, the second desired signal 10b is a filtered signal which has been shifted to a second frequency band 13b and the third desired signal 10c is a filtered signal which has been shifted to a third frequency band 13c. Optionally, one of the three frequency bands 13a-c coincides with the signal frequency band 12.

As can be seen in FIG. 2C, the shifting of the desired signals 10a-c is optionally performed such that there are guard bands 16a-b between the respective desired signals. This reduces the risk of interference between the different desired signals 10a-c.

As can be seen in FIGS. 2B-B, several desired signals can be multiplexed on a single cable. This gives a possibility to optimise utilisation of available bandwidth over the single cable. The bandwidth and centre frequency for the frequency bands 13a-c of respective desired signals 10a-c can be configured using, e.g. using frequencies of local oscillators of the filter apparatuses described in detail with reference to FIGS. 3-6 below. Each filter apparatus is then provided with its own configuration, such that the frequency bands 13a-c of the desired signals 10a-c do not overlap. The frequencies of the oscillators can e.g. be configured using configuration files provided from the controller to the filter apparatuses (1a-c of FIG. 1) for multiplexing. A corresponding configuration file is then provided to the radio base station (5 of FIG. 1) for demultiplexing.

The configuration file can e.g. have, for each filter apparatus, a centre frequency of the desired signal as received from the antennas, a bandwidth of the desired signal and a centre frequency of the output signal from the filter apparatus. Each filter apparatus can be configured individually by the controller with its own configuration file. Alternatively, a common configuration file is provided with identifiers for which filter apparatus a particular configuration is to be applied. The common configuration file is an efficient way of configuring the filter apparatuses.

This configuration of bandwidth and centre frequencies can e.g. be used to configure the guard bands 16a-b of FIG. 2C.

Figure 3:
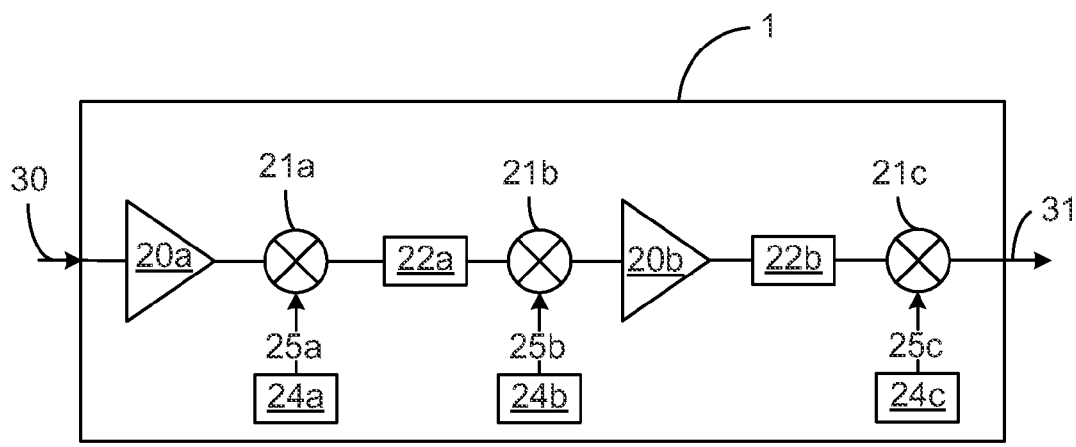
FIG. 3 is a schematic diagram illustrating a filter apparatus of FIG. 1 according to one embodiment.

FIG. 3 is a schematic diagram illustrating a filter apparatus 1 of FIG. 1. The filter apparatus 1 represents any one of the filter apparatuses 1a-c of FIG. 1. The frequency apparatus 1 comprises a first amplifier 20a, a first frequency shifter 21a, a first filter 22a, a second frequency shifter 21b, a second amplifier 20b, a second filter 22b and a third frequency shifter 21c connected serially in the mentioned order between an input 30 and an output 31 of the filter apparatus 1. The placement of the amplifiers 20a-b can be varied. In one embodiment, the first amplifier 20a is instead located between the first filter 22a and the second frequency shifter 21b and the second amplifier 20b is instead located between the second filter 22b and the third frequency shifter 21c, which, in at least some cases, reduces noise.

The amplifiers 20a-b are optional but can be provided to ensure appropriate gain of the signal through the filter apparatus, e.g. to compensate for signal loss through the frequency shifters and fillers.

Three separate shift input signals 25a-c are respectively provided to the three frequency shifters 21a-c. The shift input signals 25a-c can e.g. be provided using respective local oscillators 24a-c. The frequencies of the local oscillators are calculated from the conditions given by the configuration provided from the controller. See FIG. 5 below regarding the relationship between the local oscillator frequencies and the input and output centre frequencies and output bandwidth.

The frequency shifters 21a-c can e.g. be provided using frequency mixers, heterodynes or superheterodynes. The frequency shifters 21a-c shift the input signal by combining the input signal with the shift input signal.

As will be explained in more detail below, one of the filters 22a-b blocks frequencies below a lower cut-off frequency and the other blocks frequencies above an upper cut-off frequency. So for example, the filters 22a-b can be provided using any of the following combinations: The first filter 22a can be a low-pass filter and the second filter 22b can be a high-pass filter. The first filter 22a can be a high-pass filter and the second filter 22b can be a low-pass filter. The first filter 22a can be a low-pass filter and the second filter 22b can be a band-pass filter. The first filter 22a can be a band-pass filter and the second filter 22b can be a high-pass filter. The first filter 22a can be a high-pass filter and the second filter 22b can be a band-pass filter. The first filter 22a can be a band-pass filter and the second filter 22b can be a low-pass filter. The first filter 22a can be a band-pass filter and the second filter 22b can be a band-pass filter.

Figure 4:
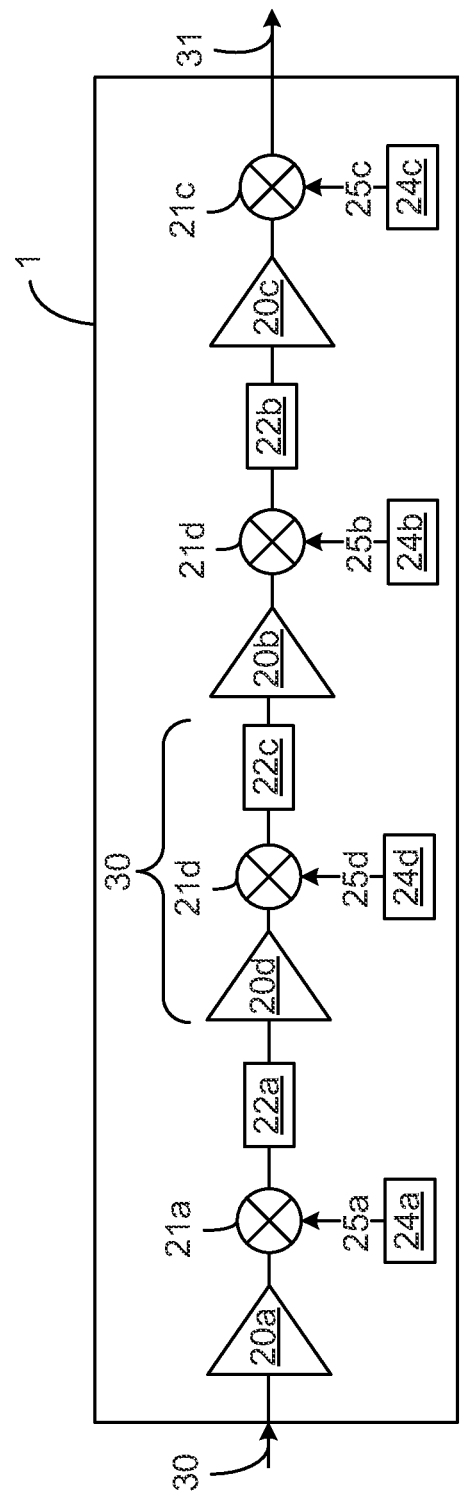
FIG. 4 is a schematic diagram illustrating a filter apparatus of FIG. 1 according to one embodiment.

FIG. 4 is a schematic diagram illustrating a filter apparatus 1 of FIG. 1 according to one embodiment. This filter apparatus 1 is similar to the filter apparatus of FIG. 3 and the description with reference to FIG. 4 will focus on the differences compared to the filter apparatus of FIG. 3. In this embodiment, there is a section 30 of additional components between the first filter 22a and the second frequency shifter 21b. This section 30 comprises a fourth amplifier 20d, a fourth frequency shifter 21d, an optional third filter 22c and a fourth local oscillator 24d. The fourth local oscillator 24d provides a fourth shift input signal 25d to the fourth frequency shifter 21d. As is explained below with reference to FIG. 6, this makes is possible for the first and second filters 22a, 22b to be filters of the same specification.

The third filter 22c is optionally provided after the fourth frequency shifter 21d. This third filter 22c could e.g. suppress undesired mixing products resulting from the first frequency shifter 21a.

Figure 5:
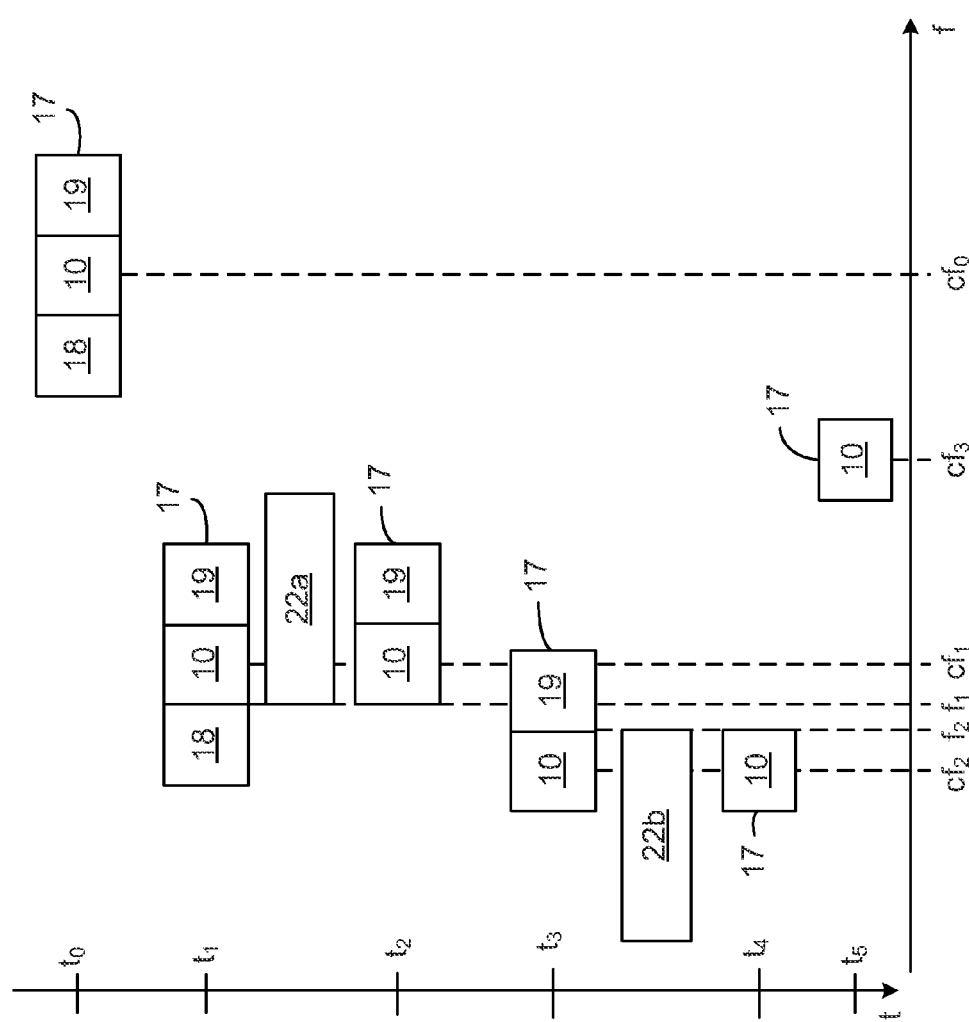
FIG. 5 is a schematic diagram illustrating the operation of the filter apparatus of FIGS. 1 and 3.

FIG. 5 is a schematic diagram illustrating the operation of the filter apparatus of FIGS. 1 and 3. FIG. 5 will now be described with further reference to the filter apparatus 1 and its components shown in FIG. 3.

The vertical axis represents time, where time increases lower down in the figure. The horizontal axis represents frequency, where frequency increases to the right in the figure.

At time t0, the signal 17 is received on the input 30 of the filter apparatus 1. The signal 17 consists of an unwanted lower frequency component 18, a desired signal 10 and an unwanted higher frequency component 19. While the lower and higher frequency components 18-19 here are shown as delimited on the outer ends (away from the desired signal 10), this may or may not be the case. The unwanted lower and higher frequency components 18-19 are simply any signal component below or above, respectively, in frequency from the frequency band carrying the desired signal 10.

The first frequency shifter 21a shifts the signal 17 such that centre frequency of the desired signal 10 is shifted from a first centre frequency cf0 to a second centre frequency cf1. Hence, at time t1, the desired signal 10 is situated around the second centre frequency cf1.

The first filter 22a, here illustrated by the frequency band it passes (i.e. not blocks), blocks out the unwanted lower frequency component 18, such that at a time t2, the signal now consists of the desired signal 10 and the unwanted higher frequency component 19. The first filter 22a blocks frequencies below a lower cut-off frequency f1, to thereby essentially block out the lower frequency component 18. Hence, the first filter 22a can here e.g. be a high-pass filter or a band-pass filter.

The second frequency shifter 21b then shifts the signal 17 such that centre frequency of the desired signal 10 is shifted from the second centre frequency cf1 to a third centre frequency cf2. Hence, at time t3, the desired signal 10 is situated around the third centre frequency cf2.

The second filter 22b, here illustrated by the frequency band it passes (i.e. not blocks), now blocks out the unwanted higher frequency component 19, such that at a time t4, the signal now only essentially consists of the desired signal 10. The second filter 22b blocks frequencies above an upper cut-off frequency f2, to thereby essentially block out the higher frequency component 19. Hence, the second filter 22b can here e.g. be a low-pass filter or a band-pass filter. This second filter also blocks overtones to any generated signals (such as from local oscillators) which have a frequency over the upper cut-off frequency f2.

The third frequency shifter 21c then shifts the signal 17 such that centre frequency of the desired signal 10 is shifted from the third centre frequency cf2 to a fourth centre frequency cf3. Hence, at time t5, the desired signal 10 is situated around the fourth centre frequency cf3. At this time t5, the signal 17 is the output signal and can e.g. be provided to a combiner for frequency division multiplexing. The fourth centre frequency cf3 is different for different filter apparatuses of the same radio base station assembly, to allow frequency division multiplexing of several signals.

Through the provided filter apparatus, the unwanted lower and higher frequency components are filtered out, and the resulting signal is provided around the third centre frequency cf3. This is achieved by the low component count and cost effective structure provided for the filter apparatus 1. Moreover, the frequency band of the desired frequency 10 (as extracted from the input signal) and its bandwidth can be configured by only adjusting the first and second shift input signals 25a-b, e.g. using the local oscillators 24a-b. Also, the resulting (third) centre frequency cf3 can also be easily configured, by only adjusting the third shift input signal 25c, e.g. using the local oscillator 24c. In other words, the filters 22a-b can be fixed in frequency characteristics and do not need to be reconfigured in any way for various pass bands or output centre frequencies. Moreover, no switches are required to connect and/or disconnect fillers depending on configuration.

While FIG. 5 is presented with various discrete points in time, it is to be understood that the filter apparatus 1 does not need to provide certain characteristics at particular points in time; rather, the components of the filter apparatus 1 are connected in a certain way and process signals sequentially as they are provided on the respective component inputs. The points in time of FIG. 5 are provided only to more clearly explain how the filter apparatus 1 operates.

It is to be noted that while the procedure illustrated in FIG. 5 first blocks out the unwanted lower frequency component 18 and secondly blocks out the unwanted higher frequency component 19, the procedure can equally well be changed such that it first blocks out the unwanted higher frequency component 19 and secondly blocks out the unwanted lower frequency component 18.

Figure 6:
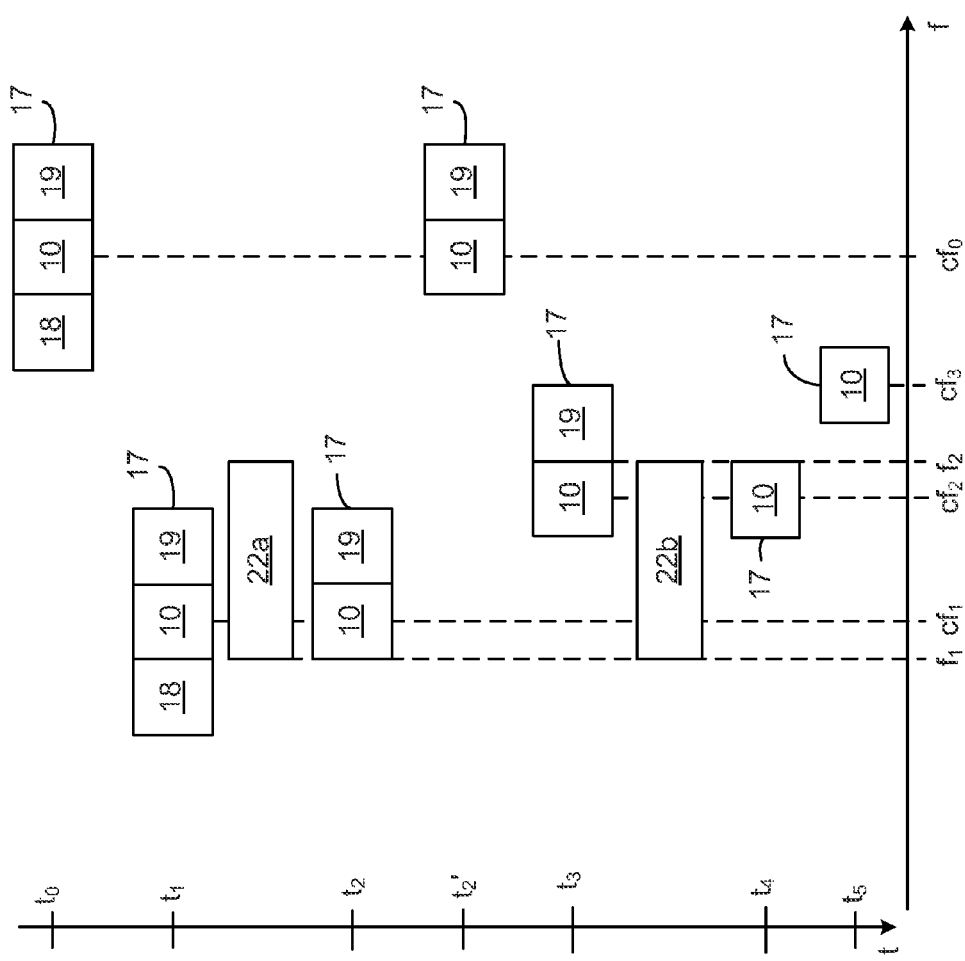
FIG. 6 is a schematic diagram illustrating the operation of the filter apparatus of FIGS. 1 and 4.

FIG. 6 is a schematic diagram illustrating the operation of the filter apparatus of FIGS. 1 and 4. FIG. 6 will now be described with further reference to the filter apparatus 1 and its components shown in FIG. 4. The vertical axis represents time, where time increases lower down in the figure. The horizontal axis represents frequency, where frequency increases to the right in the figure. The operation illustrated in FIG. 6 is similar to the operation illustrated in FIG. 5.

At time t0, the signal 17 is received on the input 30 of the filter apparatus 1. The signal 17 consists of an unwanted lower frequency component 18, a desired signal 10 and an unwanted higher frequency component 19. While the lower and higher frequency components 18-19 here are shown as delimited on the outer ends (away from the desired signal 10), this may or may not be the case. The unwanted lower and higher frequency components 18-19 are simply any signal component below or above, respectively, in frequency from the frequency band carrying the desired signal 10.

The first frequency shifter 21a shifts the signal 17 such that centre frequency of the desired signal 10 is shifted from a first centre frequency cf0 to a second centre frequency cf1. Hence, at time t1, the desired signal 10 is situated around the second centre frequency cf1.

The first filter 22a, here illustrated by the frequency band it passes (i.e. not blocks), blocks out the unwanted lower frequency component 18, such that at a time t2, the signal now consists of the desired signal 10 and the unwanted higher frequency component 19. The first filter 22a blocks frequencies below a lower cut-off frequency f1, to thereby essentially block out the lower frequency component 18. Hence, the first filter 22a can here e.g. be a high-pass filter or a band-pass filter.

The fourth frequency shifter 21d then shifts the signal 17 such that centre frequency of the desired signal 10 is shifted from the second centre frequency cf1 back to the first centre frequency cf0. Hence, at time t2', the desired signal 10 is situated around the third centre frequency cf0. Optionally, the fourth frequency shifter can shift the signal to any other suitable centre frequency, at a significant distance from the second centre frequency cf1.

The second frequency shifter 21b then shifts the signal 17 such that centre frequency of the desired signal 10 is shifted from the first centre frequency cf0 to a third centre frequency cf2. Hence, at time t3, the desired signal 10 is situated around the third centre frequency cf2.

The second filter 22b, here illustrated by the frequency band it passes (i.e. not blocks), now blocks out the unwanted higher frequency component 19, such that at a time t4, the signal now only essentially consists of the desired signal 10. The second filter 22b blocks frequencies above an upper cut-off frequency f2, to thereby essentially block out the higher frequency component 19. Hence, the second filter 22b can here e.g. be a low-pass filter or a band-pass filter. This second filter also blocks overtones to any generated signals (such as from local oscillators) which have a frequency over the upper cut-off frequency f2.

The third frequency shifter 21c then shifts the signal 17 such that centre frequency of the desired signal 10 is shifted from the third centre frequency cf2 to a fourth centre frequency cf3. Hence, at time t5, the desired signal 10 is situated around the fourth centre frequency cf3. At this time t5, the signal 17 is the output signal and can e.g. be provided to a combiner for frequency division multiplexing. The fourth centre frequency cf3 is different for different filter apparatuses of the same radio base station assembly, to allow frequency division multiplexing of several signals.

In comparison with the operation illustrated in FIG. 5, by configuring the local oscillators, the lower cut-off frequency f1 and the upper cut-off frequency f2 can be the same for the two fillers 22a-b. In other words, this embodiment allows the two fillers 22a and 22b to be of the same specification. For example, the two fillers 22a and 22b can be band pass fillers of the same specification.

In theory, between times t2 and t3, the signal could be shifted directly between the second centre frequency cf1 and the third centre frequency cf2. However, when the second centre frequency cf1 and the third centre frequency cf2 are close, by having the middle step of shifting back to a significantly higher centre frequency, mirror frequencies are reduced or even eliminated. Significantly higher can here e.g. be interpreted as at least double.

Figures 7, 8:
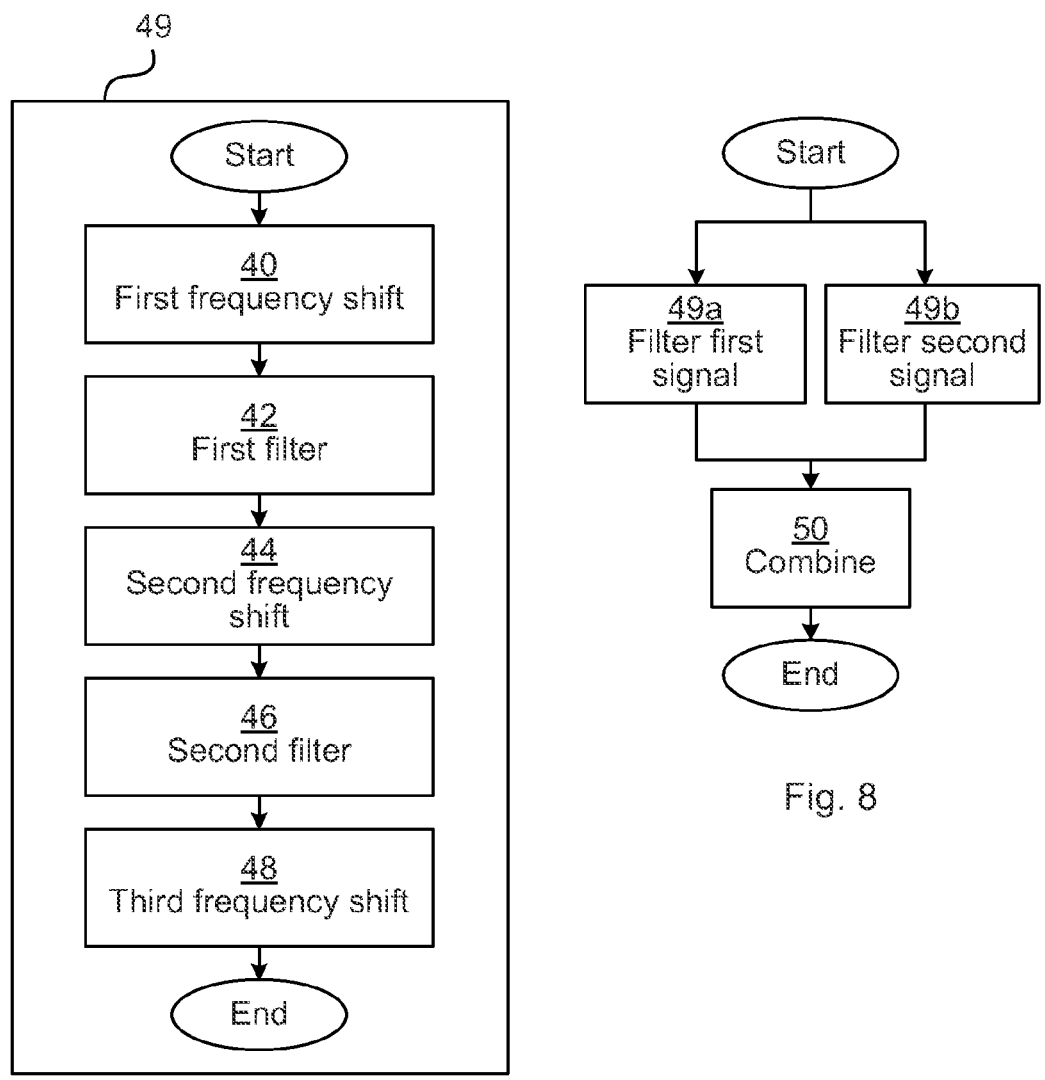
FIG. 7 is a flow chart illustrating a method performed in the filter apparatus of FIGS. 1, 3 and 4.
FIG. 8 is a flow chart illustrating a method performed in the multiplex device of FIG. 1.

FIG. 7 is a flow chart illustrating a method 49 performed in the filter apparatus of FIGS. 1, 3 and 4. The method corresponds to the procedure presented with reference to FIGS. 3, 4 and 5.

In a first frequency shift step 40, the signal is frequency shifted using a first frequency shifter. This corresponds to the actions performed between times t0 and t1 in FIG. 5 and FIG. 6.

In a first filter step 42, the signal is filtered using a first filter. This corresponds to the actions performed between times t1 and t2 in FIG. 5 and FIG. 6.

In a second frequency shift step 44, the signal is frequency shifted using a second frequency shifter. This corresponds to the actions performed between times t2 and t3 in FIG. 5 and FIG. 6. Optionally, this step comprises shifting to a significantly higher frequency and shifting to frequency which is lower than the significantly higher frequency. As explained with reference to FIG. 6 above, this allows the two fillers to be of the same specification.

In a second filter step 46, the signal is filtered using a second filter. This corresponds to the actions performed between times t3 and t4 in FIG. 5 and FIG. 6.

In a third frequency shift step 48, the signal is frequency shifted using the third frequency shifter, the output of which is connected to the output of the apparatus. This corresponds to the actions performed between times t4 and t5 in FIG. 5 and FIG. 6.

FIG. 8 is a flow chart illustrating a method performed in the multiplex device 9 of FIG. 1. The method is performed to multiplex signals.

In a filter first signal step 49a, the filtering method of FIG. 7 is performed in the first filter apparatus 1a, which results in a filtered signal of a desired signal from a first source.

In a filter second signal step 49b, the filtering method of FIG. 7 is performed in the first filter apparatus 1a, which results in a filtered signal of a desired signal from a second source.

The filter first signal step 49a and the filter second signal step 49b are performed in parallel. Optionally, there is further filter third signal step (not shown) or even more filtering steps, corresponding to the number of filtering apparatuses there are in the multiplex device.

In a combine step 50, the filtered signals from the filter first signal and filter second signal (and filter third signal, etc., if present) steps 49a-b are combined to a combined output.

While the filter apparatus presented herein is shown as filtering an uplink signal for subsequent frequency division multiplex, the filter apparatus can be used in any appropriate situation, effectively providing a configurable pass-band filter and a configurable frequency shift.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A multiplex device comprising:
at least first and second filter apparatuses configured to provide respective filtered signals at non-overlapping frequency bands on respective outputs thereof, each of the first and second filter apparatuses comprising:
  a first frequency shifter configured to accept an input signal of the corresponding filter apparatus;
  a first filter with an input from the first frequency shifter;
  a second frequency shifter with an input from the first filter;
  a second filter with an input from the second frequency shifter;
  a third frequency shifter with an input from the second filter and having an output connected to the output of the corresponding apparatus;
  wherein one of the first and the second filters blocks frequencies below a lower cut-off frequency, and the other of the first and the second filters blocks frequencies above an upper cut-off frequency;
  wherein the first frequency shifter, the first filter, the second frequency shifter, the second filter, and the third frequency shifter are connected in a sequential series;
  wherein the first, second, and third frequency shifters have respective separate shift input signals;
  wherein the bandwidth of the respective filtered signal is configurable by adjustment of the shift input signal to the first frequency shifter and by adjustment of the shift input signal to the second frequency shifter;
a first combiner device comprising:
  a first combiner input connected to the output of the first filter apparatus;
  a second combiner input connected to the output of the second filter apparatus;
  a combiner output operative to provide an output signal which is a combination of signals provided on the first and second combiner inputs.

2. The multiplex device of claim 1:
wherein an output of the first frequency shifter is connected to an input of the first filter;
wherein an output of the first filter is connected to an input of the second frequency shifter;
wherein an output of the second frequency shifter is connected to an input of the second filter;
wherein an output of the second filter is connected to the third frequency shifter.

3. The multiplex device of claim 1, further comprising a fourth frequency shifter and a third filter, connected serially between the first filter and the second frequency shifter.

4. The multiplex device of claim 1, wherein the first filter is configured to block frequencies below the lower cut-off frequency and the second filter is configured to block frequencies above the upper cut-off frequency.

5. The multiplex device of claim 1, wherein the first filter is a high-pass filter and the second filter is a low-pass filter.

6. The multiplex device of claim 1, wherein the second filter is configured to block frequencies below the lower cut-off frequency and the first filter is configured to block frequencies above the upper cut-off frequency.

7. The multiplex device of claim 1, wherein the first filter is a low-pass filter and the second filter is a high-pass filter.

8. The multiplex device of claim 1, wherein the first filter is a band-pass filter and the second filter is a band-pass filter.

9. The multiplex device of claim 1, further comprising a second combiner device, wherein the first and second combiner devices handle two different signals having different polarizations.

10. A method for multiplexing signals, the method being performed in a multiplex device comprising a first filter apparatus, a second filter apparatus and a combiner device, the method comprising:
 performing in each of the first filter apparatus and in the second filter apparatus, the steps of:
  first frequency shifting an input signal using a first frequency shifter and a first shift input signal to generate a first frequency shifted signal;
  first filtering the first frequency shifted signal using a first filter to generate a first filtered signal; and thereafter,
  second frequency shifting the first filtered signal using a second frequency shifter and a second shift input signal to generate a second frequency shifted signal;
  second filtering the second frequency shifted signal using a second filter to generate a second filtered signal; wherein in one of the first and the second filtering, frequencies below a lower cut-off frequency are blocked, and in the other of the first and the second filtering, frequencies above an upper cut-off frequency are blocked;
  and thereafter, third frequency shifting the second filtered signal using a third frequency shifter and a third shift input signal;
  wherein an output of the third frequency shifter is connected to the output of the filter apparatus;
 thereby providing at the output of the first and the second filter apparatus filtered signals at non-overlapping frequency bands, wherein the bandwidth of the respective filtered signal is configurable by adjustment of the first shift input signal to the first frequency shifter and by adjustment of the second shift input signal to the second frequency shifter; and comprising the further step of;
 combining in the combiner device, the outputs of the first and the second filter apparatuses into a combined output.

11. The method of claim 10:
 wherein the first filtering comprises blocking frequencies below the lower cut-off frequency;
 wherein the second filtering comprises blocking frequencies above the upper cut-off frequency.

12. The method of claim 10, wherein the first filter is a high-pass filter and the second filter is a low-pass filter.

13. The method of claim 10:
 wherein the second filtering step comprises blocking frequencies below the lower cut-off frequency;
 wherein the first filtering step comprises blocking frequencies above the upper cut-off frequency.

14. The method of claim 10, wherein the first filter is a low-pass filter and the second filter is a high-pass filter.

15. The method of claim 10, wherein the first filter is a band-pass filter and the second filter is a band-pass filter.

16. The method of claim 10, wherein the second frequency shifting comprises shifting to a significantly higher frequency and shifting to another frequency which is lower than the significantly higher frequency.

* * * * *